United States Patent
Utsumi

[19]

[11] Patent Number: 6,040,956

[45] Date of Patent: *Mar. 21, 2000

[54] CARTRIDGE INSERTION/DISCHARGE OPENING STRUCTURE OF RECORDING/ REPRODUCTION UNIT FOR LIBRARY APPARATUS

[75] Inventor: Kenichi Utsumi, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/021,345

[22] Filed: Feb. 10, 1998

[30] Foreign Application Priority Data

Sep. 9, 1997 [JP] Japan .................................. 9-244318

[51] Int. Cl.[7] .................................................. G11B 15/68
[52] U.S. Cl. .............................. 360/92; 369/36; 369/178
[58] Field of Search ................................... 369/75.1–77.2, 369/36, 178, 191; 360/92

[56] References Cited

U.S. PATENT DOCUMENTS

| | | | |
|---|---|---|---|
| 4,498,112 | 2/1985 | Georgens et al. | 360/96.5 |
| 4,609,955 | 9/1986 | Sims, Jr. | 360/93 |
| 5,046,169 | 9/1991 | Tsujino | 360/96.5 |
| 5,306,772 | 4/1994 | Mimura et al. | 525/92 A |
| 5,783,619 | 7/1998 | Shinohara | 524/318 |
| 5,822,149 | 10/1998 | Takase et al. | 360/94 |
| 5,859,108 | 1/1999 | Shinohara | 524/430 |

FOREIGN PATENT DOCUMENTS

1-237893  9/1989  Japan .

*Primary Examiner*—William J. Klimowicz
*Attorney, Agent, or Firm*—Greer, Burns & Crain, Ltd.

[57] ABSTRACT

A cartridge insertion/discharge opening section of a recording/reproduction unit includes introduction guides for guiding a cartridge inserted by an accessor from the external to the interior of the recording/reproduction unit. The introduction guides are made of polyacetal, which is particularly adapted for use with cartridges made of polycarbonate.

5 Claims, 11 Drawing Sheets

CARTRIDGE INSERTION/DISCHARGE OPENING STRUCTURE OF RECORDING/ REPRODUCTION UNIT FOR LIBRARY APPARATUS

BACKGROUND OF THE INVENTION

1) Field of the Invention

The present invention relates to a recording/reproduction unit for use in a library apparatus which stores a large number of cartridges such as magnetic tape cartridges and optical disk cartridges. The recording/reproduction unit performs processing such as writing/reading of recording/ recorded data on/from a storage medium accommodated in the cartridge transferred through a transferring mechanism and inserted thereinto. The present invention more particularly relates to a cartridge insertion/discharge opening structure of the recording/reproduction unit.

2) Description of the Related Art

In general, a library apparatus functions as a large-capacity external storage memory, and a storage rack in its locker stores several thousands of cartridges each accommodating, for example, a magnetic tape as a storage medium, and access such as writing/reading of recording/ recorded data is automatically performed on the storage medium within each of the cartridges.

Furthermore, in addition to the aforesaid storage rack (storage unit) for storing cartridges, the library apparatus is equipped with a station for conducting the entry of a cartridge from the external into the apparatus and the exit of the cartridge from the interior of the apparatus to the external, a plurality of magnetic tape decks (recording/ reproduction units; which will be referred hereinafter to as decks) for conducting access such as writing/reading of recording/recorded data with respect to a storage medium (magnetic tape) within a cartridge, and an accessor robot (transferring mechanism; which will be referred hereinafter as an accessor) for performing the conveyance of the cartridges among the cartridge entry/exit station, the storage rack and the decks.

In such a library apparatus, in response to an access request to one cartridge from a host unit or the like, the accessor travels toward the storage rack to search for the cartridge there, and subsequently, a hand mechanism grips that cartridge and transfers it to the deck for insertion into the deck. With these operations, in that deck, given processing is done with respect to the storage medium (magnetic tape) within the inserted cartridge. After the completion of the processing, the cartridge discharged or ejected from the deck is again gripped by the hand mechanism and conveyed by the accessor up to the storage rack to be stored at a given position.

In a prior library apparatus, a dedicated cartridge delivering and receiving mechanism is installed in each of the decks so that the insertion of the cartridge into the deck or the extraction (pulling-out) of the cartridge from the deck is carried out through the cartridge delivering and receiving mechanism. In this case, the accessor is not designed to directly carry out the insertion/extraction of the cartridge into/from the deck.

In the case that the cartridge delivering and receiving mechanism is provided at every deck, the mounting space enlarges within the library apparatus and the system becomes complex complication. For this reason, the reduction of the mounting space and simplification of the system are desirable.

For meeting this requirement, an idea may naturally be born to omit the cartridge delivering and receiving mechanism and enable the accessor to directly carry out the insertion/extraction of the cartridge into/from the deck without the intervention of the cartridge delivering and receiving mechanism.

In a prior art, cartridge delivering and receiving mechanism intervenes between the accessor and the deck, and an insertion/discharge opening of the cartridge delivering and receiving mechanism is designed to be openable and movable, and therefore, even if the difference in position somewhat occurs between the accessor (the cartridge gripped by a hand mechanism) and the cartridge delivering and receiving mechanism, the accessor would be capable of certainly carrying out the insertion/extraction of the cartridge with respect to the deck owing to the intervention of the cartridge delivering and receiving mechanism.

On the other hand, in the case where the accessor directly performs the insertion/extraction of the cartridge with respect to the deck without the use of the cartridge delivering and receiving mechanism as mentioned above, if the accessor is misaligned with the deck, the insertion/extraction of the cartridge can be prevented.

This means that it is essential that the accessor be allowed to directly accomplish the insertion/extraction of the cartridge with respect to the deck regardless of the occurrence of the positional difference to some extent between the accessor and the deck. For this purpose, one possible way may be that a guide member is provided in an insertion/ discharge opening section of the deck to guide the cartridge, inserted by the accessor toward the interior of the deck.

In this case, since several decks treat several thousands of cartridges in one library apparatus, the guide member of the deck opening section directly comes into contact with the cartridges at a considerably high frequency. Therefore, it is necessary that the guide member to be made of a material having not only superior strength and abrasion resistance but also a low contact resistance with respect to the cartridge so that the cartridge is always surely guided by the guide member.

SUMMARY OF THE INVENTION

The present invention has been developed with a view of eliminating these problems, and it is therefore an object of this invention to provide a cartridge insertion/discharge opening structure of a recording/reproduction unit for a library apparatus which allows a transferring mechanism to certainly conduct direct cartridge insertion/extraction operations into/from the recording/reproduction unit.

For this purpose, in accordance with the present invention, there is provided a cartridge insertion/discharge opening structure of a recording/reproduction unit for use in a library apparatus storing cartridges, each accommodating a storage medium. The recording/reproduction unit conducts recording/reproduction process on the storage medium within the cartridge transferred by a transferring mechanism. The cartridge insertion/discharge opening structure includes a guide member for insertion/discharge of the cartridge and for guiding the cartridge to be inserted from the external through the transferring mechanism toward the interior of the recording/reproduction unit, with the guide member being provided in a cartridge insertion/discharge opening section of the recording/reproduction unit. Where the casing of the cartridge is made of a polycarbonate, the guide member is made of a polyacetal.

Thus, in the cartridge insertion/discharge opening structure according to this invention, an extremely simple structure in which the polyacetal having an excellent strength/ abrasion resistance and a low contact resistance is employed as a material for the guide member. In as such, even if the guide member directly comes into contact with the polycarbonate cartridges at a considerably high frequency, no problem relating to strength and abrasion arises, and certain guiding of the cartridges to the recording/reproduction units is always possible.

Accordingly, the transferring mechanism can surely carry out the direct cartridge insertion/extraction operations with respect to the recording/reproduction unit, and the hand mechanism can directly perform the cartridge insertion/extraction on each of the recording/reproduction units without the use of the cartridge delivering and receiving mechanism, which greatly contributes to the size and cost reduction of the library apparatus.

DESCRIPTION OF THE PREFERRED EMBODIMENT

An embodiment of the present invention will be described hereinbelow with reference to the drawings.

First of all, referring to FIG. 2, a description will be made hereinbelow of the entire arrangement of a library apparatus to which this embodiment is applicable.

Figure 2:
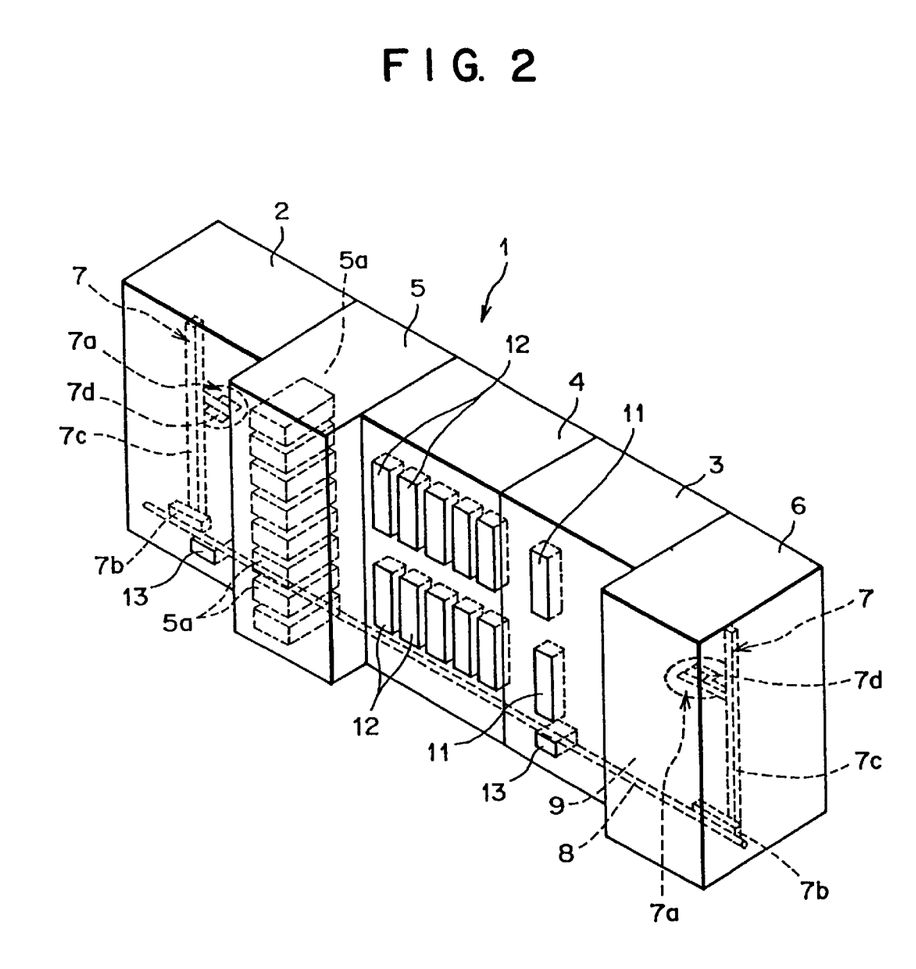
FIG. 2 is a perspective view illustratively showing the entire arrangement of a library apparatus to which this embodiment is applicable.

FIG. 2 is a perspective view illustratively showing the entire constitution of a library apparatus to which this embodiment is applicable. As shown in FIG. 2, a library apparatus 1 involving this embodiment stores a large number of magnetic tape 10 (see FIGS. 7 to 11; cartridges each cartridge accommodating a magnetic tape as a storage medium) and conducts operations such as writing/reading of recording/recorded data on each of the magnetic tape cartridges 10.

The library apparatus 1, includes for example, left and right (two) accessor units (which will be referred hereinafter to as LAU, RAU, respectively) 2, 3, a cartridge storage unit (which will be referred hereinafter to as a CSU)4, a tape drive mount unit (which will be referred hereinafter to as a TMU) 5, and an accessor extend unit (which will be referred hereinafter to as an AEU) 6, which are in a connected relation to each other. Also included in the apparatus 1 are accessor robots (transferring mechanisms; which will be referred hereinafter to as accessors) 7 which are located on the left and right sides, respectively, and which move within these units 2 to 6 to transfer the cartridges 10.

The LAU 2 and RAU 3 function as garages for the accessors 7, and on the front side of the RAU 3 (the external space side, that is, the side where the operator operates the apparatus) there are provided a pair of upper and lower cartridge entry/exit stations [each of which will be referred hereinafter to as a CAS (Cartridge Access Station)] 11, for carrying out the entry or exit of the cartridge 10 into or from the library apparatus 1 and a cartridge forced exit station (FES) 13 for forcedly discharging a defective cartridge to the external. In addition, another FES 13 is placed on the front side of LAU 2.

The CSU 4 stores a large number of cartridges 10, and in this embodiment, five cartridge direct entry/exit stations (each of which will be referred hereinafter to as a DEE) 12 are set on the upper side and five DEEs 12 on the lower side, ten in total. In each of the DEEs 12, a magazine (not shown) storing a plurality of cartridges 10 is set in order to permit the simultaneous entry or exit of the plurality of cartridges 10 into or from the library apparatus 1.

Furthermore, a storage rack (not shown) having a large number of cells for storing a large number of cartridges 10 is placed on an inner wall surface of each of the LAU 2, RAU 3 and CSU 4, and the cartridge 10 from the CAS 11 or the DEE 12 is stored in a given cell of the storage rack through the use of the accessor 7.

The TMU 5 has a plurality of (8 in FIG. 2) magnetic tape decks (recording/reproduction units, MTUs; which will be referred hereinafter to as decks) 5a, and each of the decks 5a conducts the write/read processing of recording/recorded data onto/from a magnetic tape within the cartridge 10 transferred by the accessor 7. This invention relates to a cartridge insertion/discharge opening structure for the insertion/discharge of the cartridge 10 into/from each of decks 5a, and the structure and operation thereof will be described herein later with reference to FIGS. 1 and 4 to 11.

The AEU 6 includes a power source (not shown) for supply of an operating power to each of the accessors 7 and a controller (not shown) for control of the accessors 7.

These units 2 to 6 are in a coupled relation to each other and disposed in a state where their rear surfaces (the sides opposite to the above-mentioned front side) are brought into contact with a wall surface or the like, and organize the library apparatus 1. Further, formed in the library apparatus 1 is an operating space (accessor passage) 9 for the accessors 7 which runs through the units 2 to 6, and placed on the bottom surface of this operating space 9 is a rail (X rail) 8 for guiding the respective accessors 7, which allows each of the accessors 7 to move within the operating space 9.

In addition to a hand mechanism 7d for holding the cartridge 10 to perform the insertion/extraction thereof, each of the accessors 7 has a carriage 7b movable in the horizontal directions along the X rail 8 for moving a hand assembly 7a including this hand mechanism 7d up to a given position and a vertical column 7c for vertically guiding the hand assembly 7a on the carriage 7b, which constitute a moving mechanism.

In the library apparatus 1 thus constructed, the cartridge 10 from the CAS 11 or the DEE 12 is gripped and taken out by the hand mechanism 7d of the accessor 7 and is inserted into and stored in a given cell of the storage rack after being carried by the accessor 7 through the operating space 9.

Furthermore, of a large number of cartridges 10 stored in the respective cells of the storage rack, a cartridge(s) 10 specified by a host unit is gripped and pulled out by the hand mechanism 7d of the accessor 7 and then transferred by the accessor 7 through the operating space 9 to the deck 5a of the TMU 5 to be inserted thereinto.

In the deck 5a, after the recording/reproduction processing on/from the magnetic tape housed in the cartridge 10, the cartridge 10 staying within the deck 5a is discharged therefrom and gripped and taken out by the hand mechanism 7d of the accessor 7 and subsequently inserted into and stored in a given cell of the storage rack by the accessor 7 after passing through the operating space 9.

Incidentally, for discharging the cartridge(s) 10 stored in the storage rack to the exterior of the library apparatus 1, the cartridge 10 to be discharged is gripped by the hand mechanism 7d of the accessor 7 to be taken out from the storage rack and then transferred through the operating space 9 to the CAS 11 or the DEE12 by the accessor 7 to be inserted into a given position (cell) of the CAS 11 or the DEE 12.

Secondly, referring to FIG. 3, a brief description will be taken hereinbelow of a constitution of the accessor 7 in this embodiment.

Figure 3:
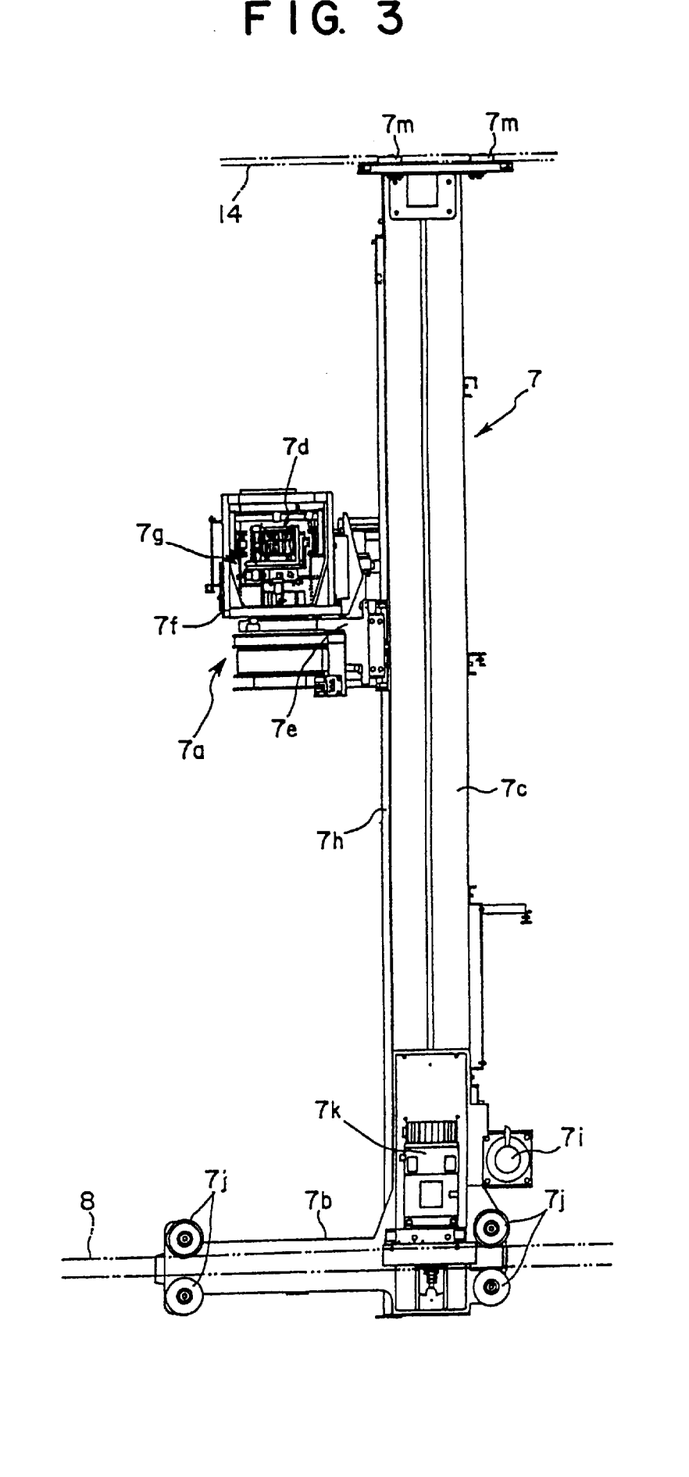
FIG. 3 is a front elevational view showing an accessor in this embodiment.

FIG. 3 is a front elevational view showing the accessor 7 in this embodiment. As shown in FIG. 3, the accessor 7 is, as mentioned before, composed of the hand assembly 7a including the hand mechanism 7d, the carriage 7b and the vertical column 7c.

The hand assembly 7a is constructed in such a manner as to place a picker section 7g including the hand mechanism 7d through a tilt base 7f on a supporting base 7e. The hand mechanism 7 is mounted to be movable in the forward and backward directions with respect to the picker section 7g, and is made to be sliding-driven by a drive mechanism (not shown) in the forward and backward directions. Further, the picker section 7g is mounted on the tilt base 7f to be swingable, and is swingingly driven by a tilt mechanism (not shown) to adjust the cartridge insertion/extraction direction with respect to the horizontal plane. Still further, the hand mechanism 7d, the picker section 7g and the tilt base 7f are set to a supporting base 7e to be revolvable around a vertical shaft by a drive mechanism (not shown).

The supporting base 7e making up the hand assembly 7a is attached to the vertical column 7c to be allowed to slide up and down while being guided by a guide rail 7h fixed vertically along the vertical column 7c. In addition, the supporting base 7e is coupled to a belt (not shown; a belt wound around a pair of pulleys built in upper and lower locations of the vertical column 7c). When this belt is rotationally driven by an elevating drive motor 7i, the supporting base 7e, that is, the whole hand assembly 7a, is vertically shifted to be positioned at a given height.

The carriage 7b is integrally connected to a lower end side of the vertical column 7c and is made to travel along the X rail 8 while supporting the vertical column 7c. Onto the front and rear sides of this carriage 7b, there are pivotally fitted two sets (two pairs) of traveling rollers 7j, 7j each set of which are situated to vertically sandwich the X rail 8 therebetween to be rotatable in accordance with the traveling of the carriage 7b.

Furthermore, the X rail 8 is equipped with a traveling drive rack (not shown) made to extend in its longitudinal directions. In addition, the carriage 7b is provided with a pinion (not shown) rotationally driven by a traveling drive motor 7k.

Still further, a top rail 14 is laid in an upper section of the operating space 9 for the accessor 7 to extend in parallel to the X rail 8. In addition, on the upper end side of the vertical column 7c, there are pivot-ally fitted two sets (two pairs) of guide rollers 7m, 7m which are situated on the front and rear sides to horizontally sandwich the top rail 14 therebetween to be rotatable in accordance with the traveling of the carriage 7b.

Thus, when the traveling drive motor 7k rotationally drives the pinion, the accessor 7 is wholly moved along the X rail 8 while the pinion and the traveling drive rack gear with each other. Further, when the elevating drive motor 7i revolves the aforesaid belt, the hand assembly 7a is wholly moved up and down along the vertical column 7c. Consequently, the hand assembly 7a (the picker section 7g including the hand mechanism 7d) is shifted up to a given position within a plane including the X rail 8 and the vertical column 7c and positioned thereat.

Referring to FIGS. 1 and 4 to 11, a description will be made hereinbelow of a cartridge insertion/discharge opening structure of each of the decks (recording/reproduction units) which constitutes a feature of this invention.

Figure 1:
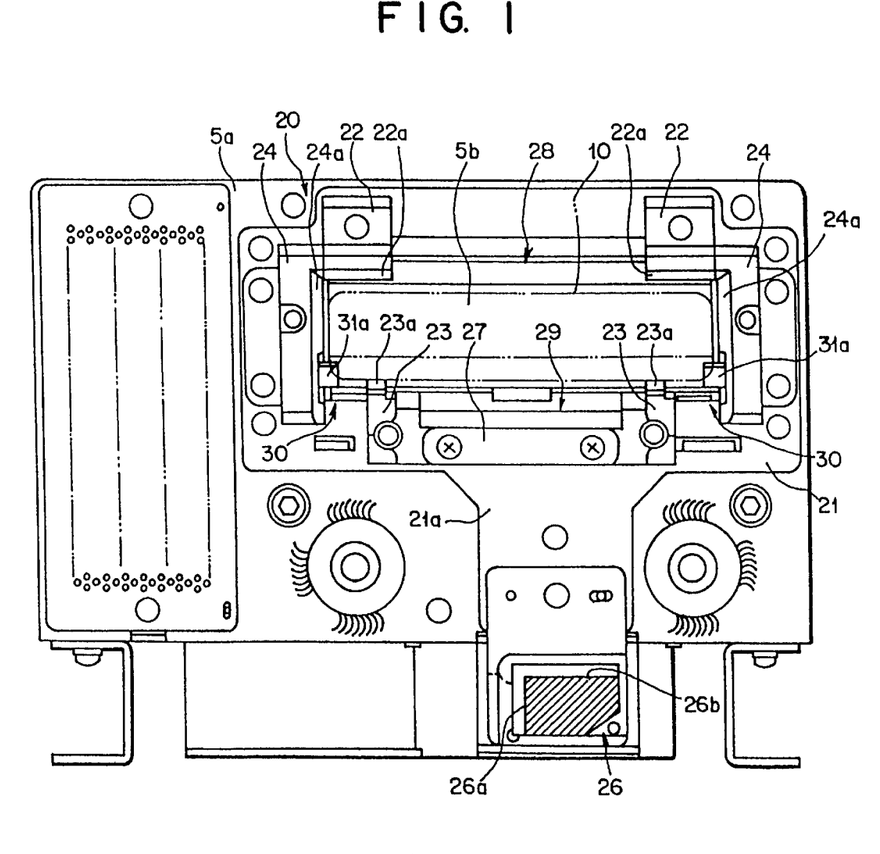
FIG. 1 is a front elevational view showing a recording/reproduction unit (deck) for a library apparatus which includes a cartridge insertion/discharge opening structure according to an embodiment of the present invention.
Figure 4:
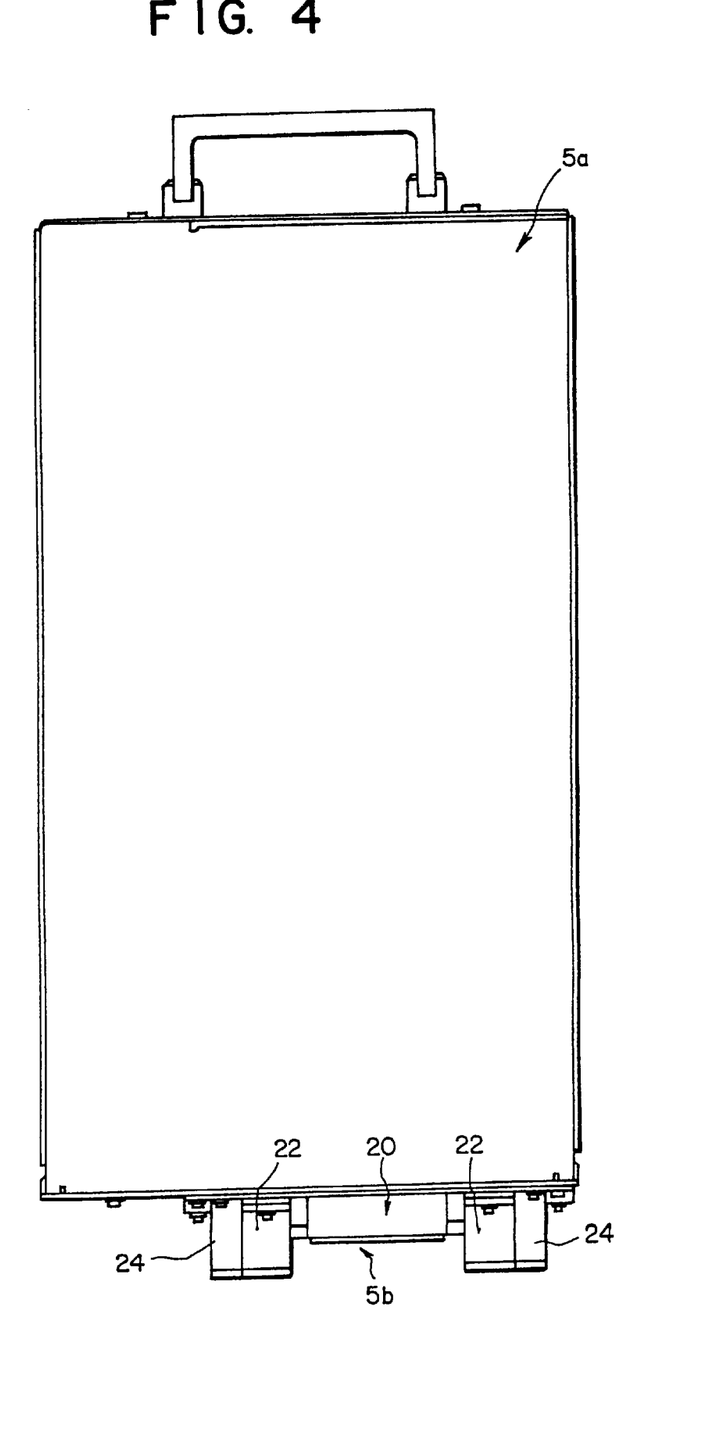
FIGS. 4 and 5 are respectively a plan view and a side elevational view each showing the recording/reproduction unit (deck) for a library apparatus which has the cartridge insertion/discharge opening structure according to this embodiment.
Figure 5:
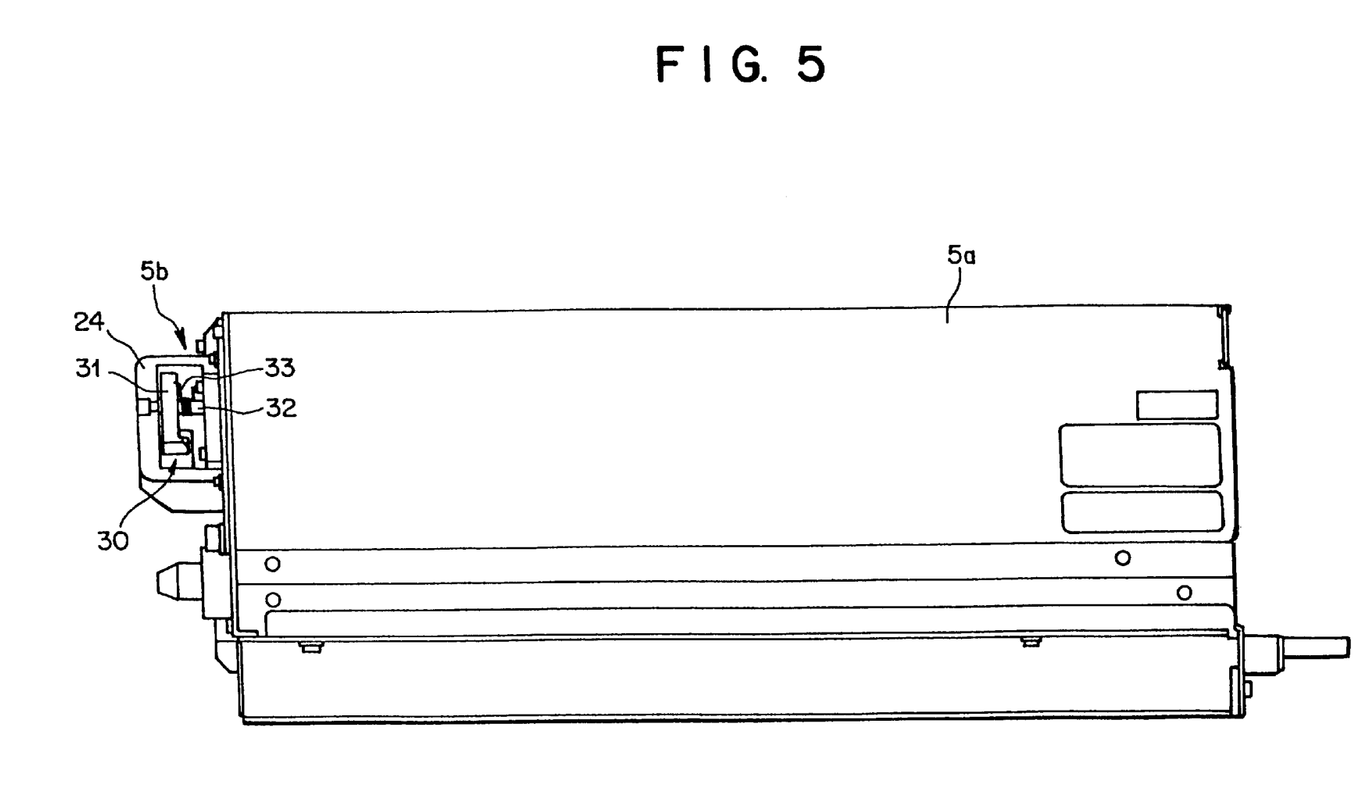
Figure 6:
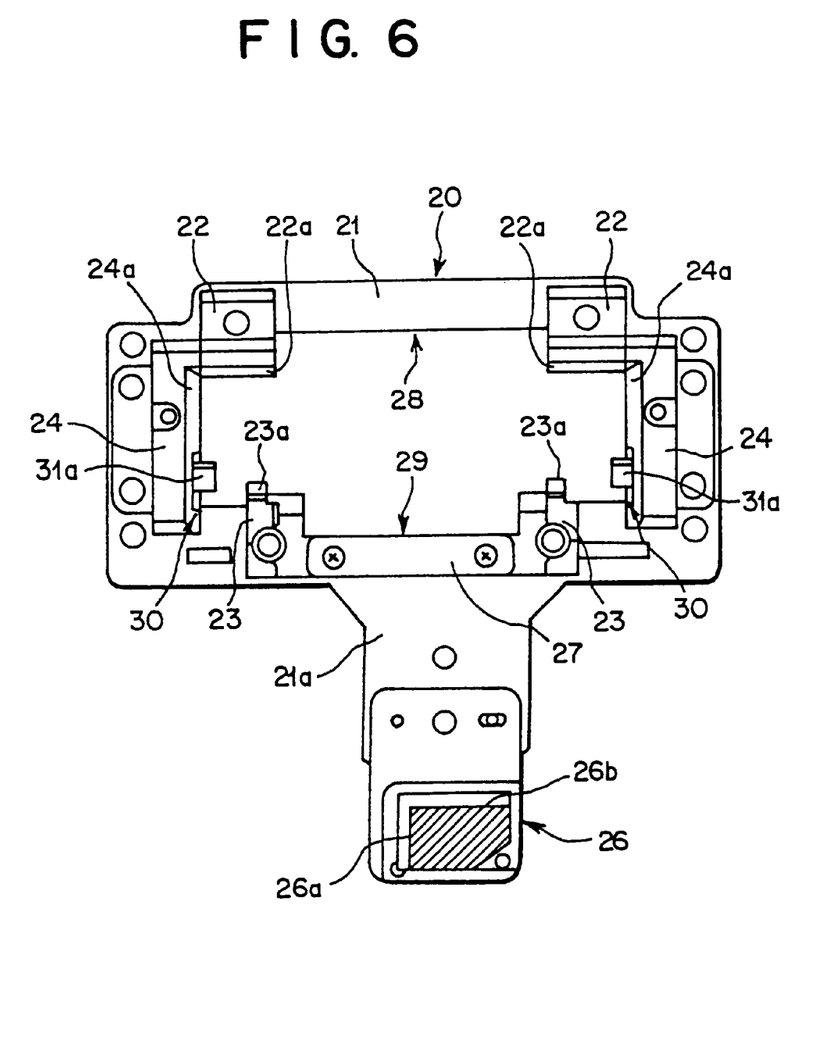
FIG. 6 is a front elevational view showing the cartridge insertion/discharge opening structure according to this embodiment.
Figure 7:
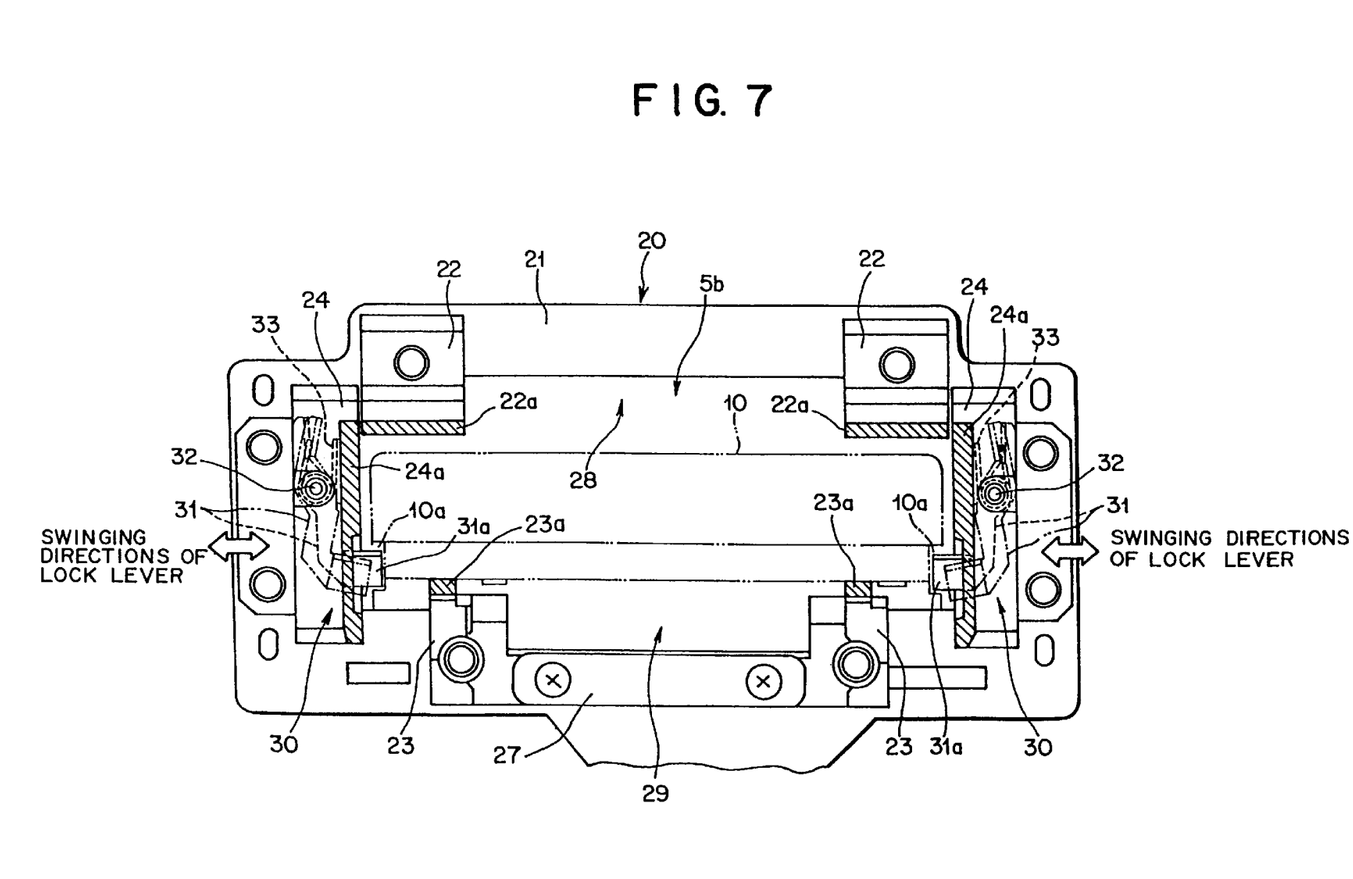
FIGS. 7 and 8 are respectively a front elevational view and a plan view each showing a principal portion of the cartridge insertion/discharge opening structure according to this embodiment.
Figure 8:
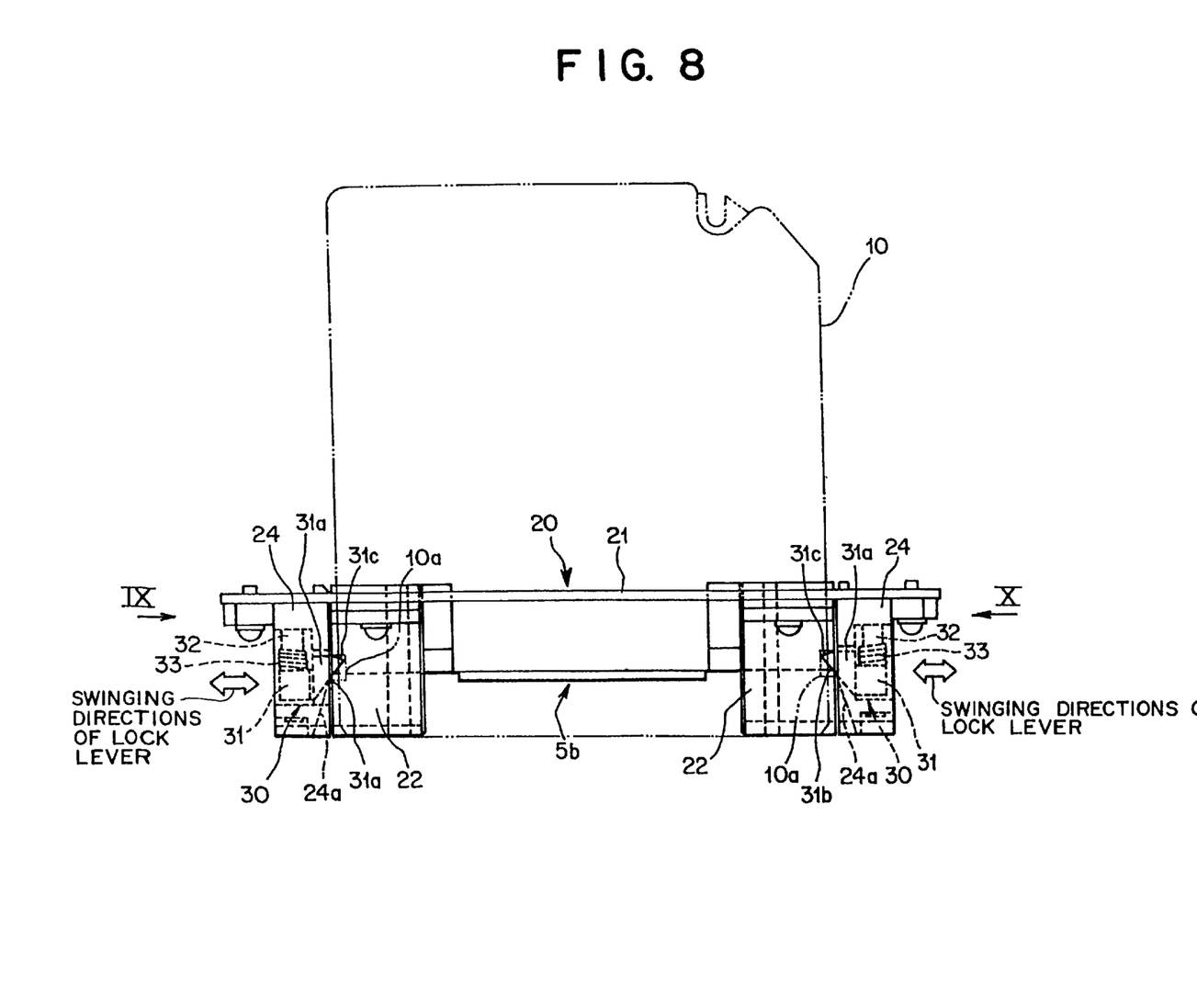
Figure 9:
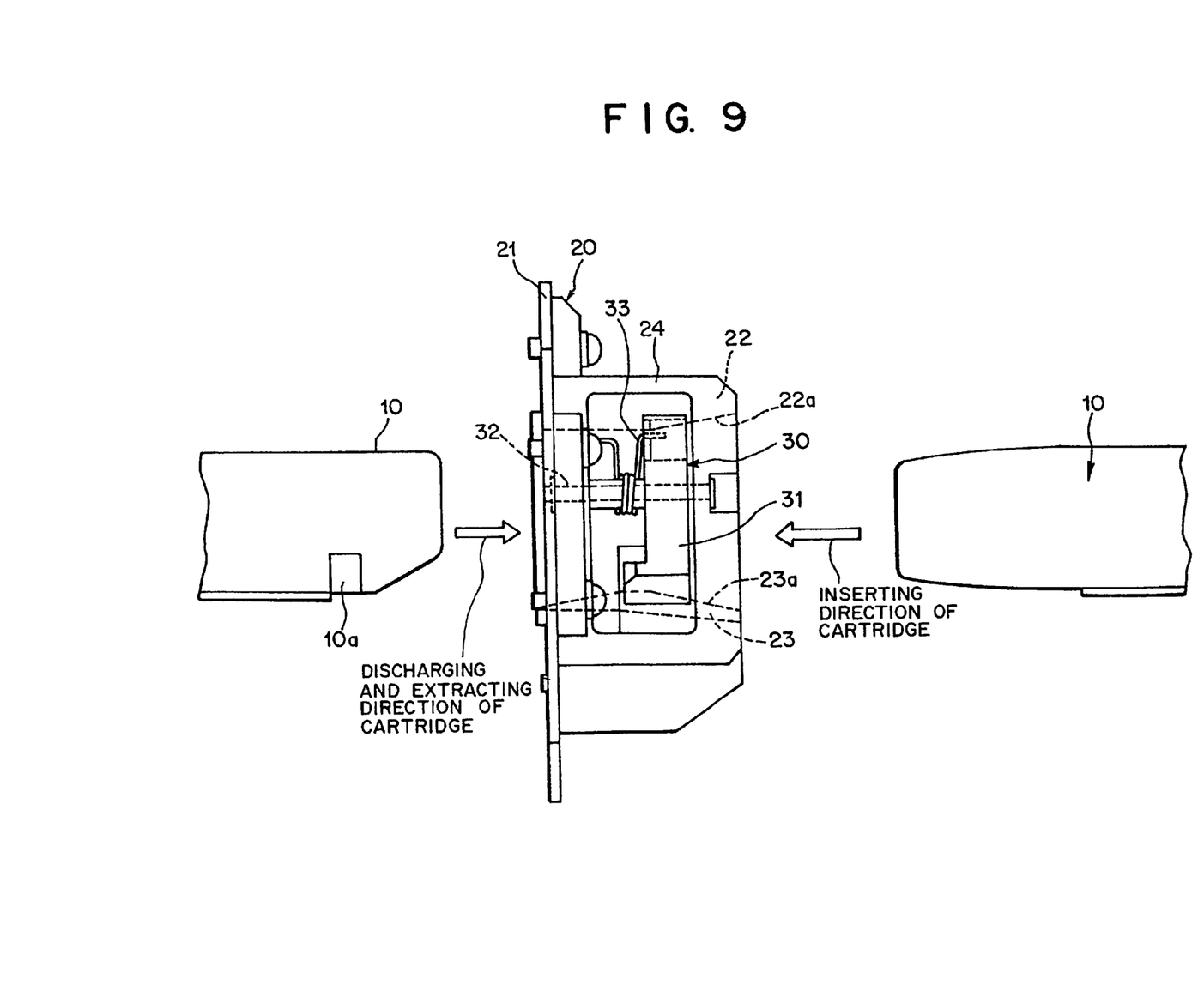
FIGS. 9 and 10 are illustrations of portions pointed out by arrows IX and X of FIG. 8, respectively.
Figure 10:
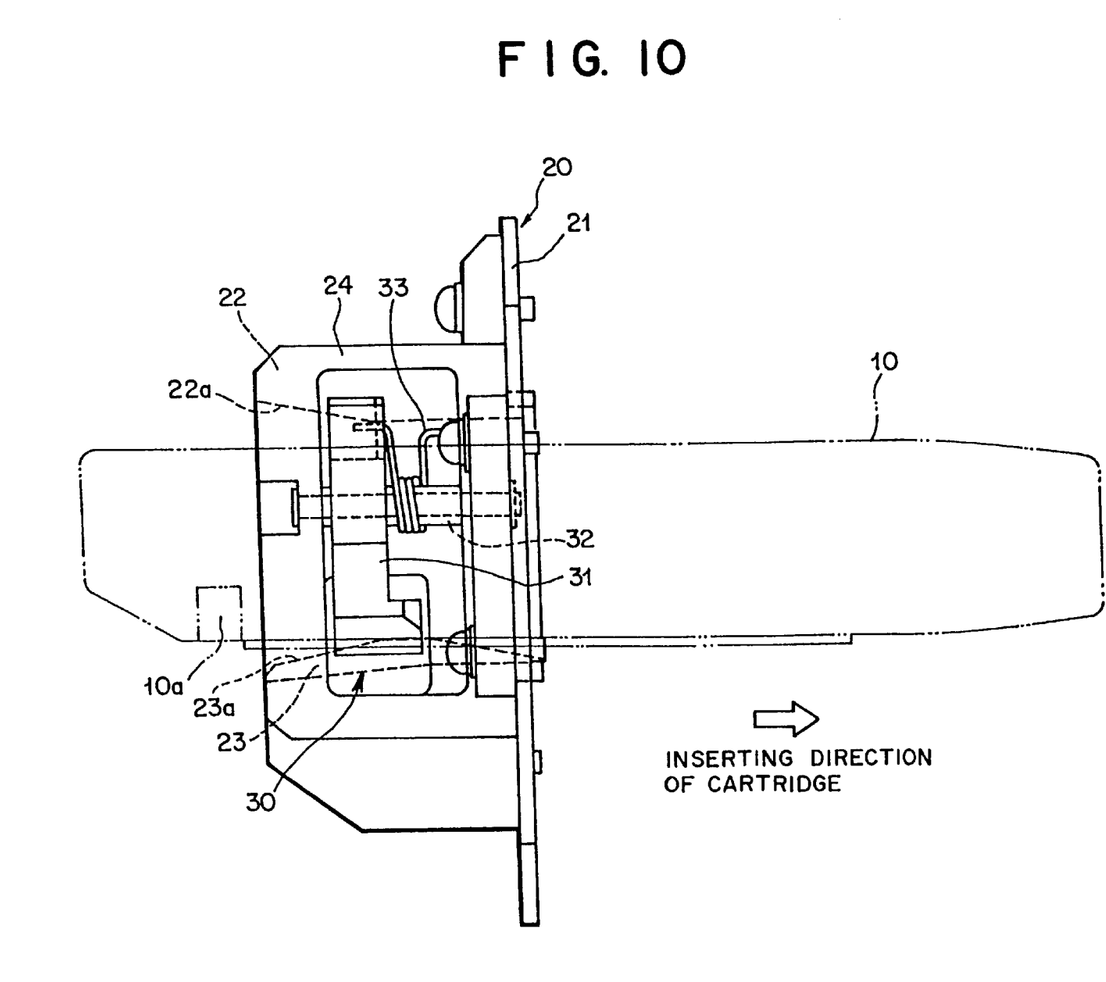
Figure 11:
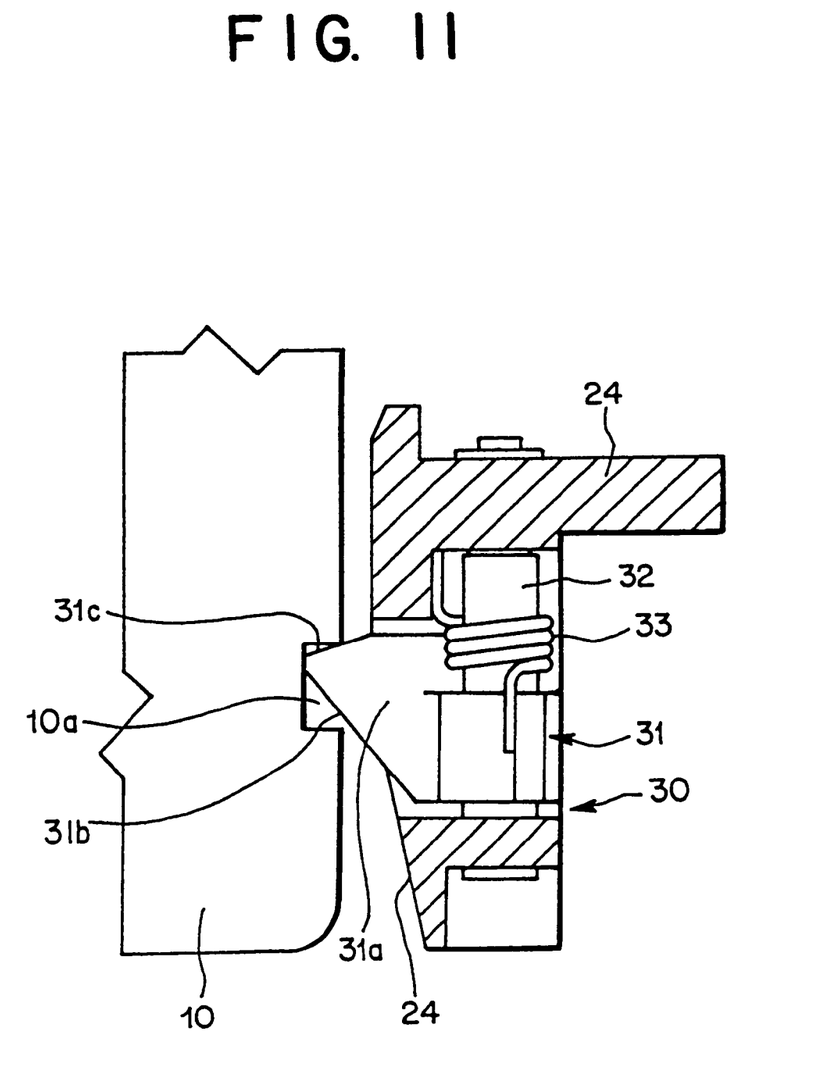
FIG. 11 is an enlarged plan view of a principal portion available for explaining a cartridge locking condition to be taken due to a detent mechanism in this embodiment.

FIGS. 1 and 4 to 11 are illustrations of the cartridge insertion/discharge opening structure according to an embodiment of this invention. In more detail, FIGS. 1, 4 and 5 are respectively a front elevational view, a plan view and a side elevational view each showing a deck having that structure, FIG. 6 is a front elevational view showing the same structure, FIGS. 7 and 8 are respectively a front elevational view and a plan view each showing a principal portion of the structure in this embodiment, FIG. 9 is an illustration of a portion indicated with an arrow IX in FIG. 8, FIG. 10 is an illustration of a portion indicated with an arrow X in FIG. 8, and FIG. 11 is an enlarged plan view showing a principal portion for describing a cartridge locking condition to be taken by a detent mechanism in this embodiment.

As shown in FIGS. 1, 4 and 5, a cartridge insertion/discharge opening section 5b of a deck 5a according to this embodiment is equipped with a cartridge insertion/discharge opening structure (bezel structure) 20.

This cartridge insertion/discharge opening structure 20 is, as shown in FIGS. 1 and 6, composed of a base member 21, introduction guides (guide members) 22 to 24, a reference flag 26 and detent mechanisms 30.

The base member 21 has a frame-like configuration and is attached to an outer circumference of the opening section 5b in the front surface of the deck 5a. After the introduction guides 22 to 24, the reference flag 26, a hand strike portion (Z reference plane) 27 and the detent mechanisms 30 are previously fitted to the base member 21 as shown in FIG. 6, the base member 21 integrally supporting these components is made to be set to the outer circumference of the opening section 5b in the front surface of the deck 5a as shown in FIG. 1.

The base member 21 has a reference flag fitting section 21a formed to extend downwardly, and the reference flag 26 is fitted to a tip portion of the reference flag fitting section 21a in a state of being accurately positioned with respect to the opening section 5b (introduction guides 22 to 24) of the deck 5a. On the reference flag 26 there are cut or drawn an X reference position 26a and a Y reference position 26b whereby the accessor 7 can optically recognize or detect the X and Y positions of the opening section 5b (introduction guides 22 to 24) of the deck 5a.

Furthermore, the hand strike portion 27 is provided as a Z reference plane on a front surface lower portion of the base member 21. In a manner that a hand member(s) of the hand mechanism 7d is directly brought into contact with the hand strike portion 27, the accessor 7 finds the Z position of the opening section 5b (introduction guides 22 to 24) of the deck 5 a.

In this embodiment, the X directions correspond to the left- and right-hand directions in FIG. 1 or 6, the Y directions correspond to the vertical directions in FIG. 1 or 6, and the Z directions correspond to the vertical directions in FIG. 4 or the left- and right-hand directions in FIG. 5.

On the other hand, the introduction guides 22, 23, 24 are for the purpose of guiding the cartridge 10, coming from the external through the accessor 7, to the interior of the deck 5a, and as shown in FIGS. 1 and 6 to 10, have tapered surfaces developing from the deck 5a side to the external (that is, tapered surfaces flaring toward the accessor 7 side) 22a, 23a, 24a. In FIG. 7, the formed portions of the tapered surfaces 22a, 23a, 24a of the introduction guides 22, 23, 24 are shaded with oblique lines.

The introduction guides 22, 23, 24 each comprises a pair of guides disposed symmetrically in the left- and right-hand directions. Both the introduction guides 22, 22 are located at left and right positions on the upper side of the opening section 5b, respectively, and serve to guide the upper surface of the cartridge 10 by their tapered surfaces 22a. The introduction guides 23, 23 are located at left and right positions on the lower side of the opening section 5b, respectively, and serve to guide the lower surface of the cartridge 10 by their tapered surfaces 23a. The introduction guides 24, 24 are situated on both sides of the opening section 5b, respectively, and act to guide both side surfaces of the cartridge 10 by their tapered surfaces 24a.

In addition, as shown in FIGS. 6 to 8, hand escape (clearance) spaces 28, 29 for the hand mechanism 7d of the accessor 7 are defined between the upper side introduction guides 22, 22 and between the lower side introduction guides 23, 23, respectively.

The hand mechanism 7d is made up of a pair of upper and lower hand members to be vertically driven, and the cartridge 10 is gripped by the hand mechanism 7d from the above and below.

Accordingly, for avoiding the interference of the pair of hand members with the cartridge insertion/discharge opening structure 20 surrounding the opening section 5b, such as in the case where the pair of upper and lower hand members are vertically operated to release the cartridge 10 inserted into the opening section 5b or in case where they are vertically driven to grip the cartridge 10 discharged from the deck 5a to the opening section 5b, the cartridge insertion/discharge opening structure 20 according to this embodiment has the hand escape spaces 28, 29 in which the pair of upper and lower hand members come when being in the open condition.

Since in one library apparatus several decks 5a deal with several thousands of cartridges 10, the introduction guides 22 to 24 at the opening sections 5b of the decks 5a come directly into contact with the cartridges 10 at a considerably high frequency. For this reason, it is necessary that the introduction guides 22 to 24 to be made of a material having not only superior strength and abrasion resistance but also a low contact resistance in relation to the cartridge so that the cartridge 10 is always surely guided by the introduction guides 22 to 24.

In this embodiment, the cartridges 10 are one-reel type magnetic tape cartridges, for example, I3480 type. Their casings are commonly made of a polycarbonate ([OC$_6$H$_4$C(CH$_3$)$_2$C$_6$H$_4$OCO)]$_x$; linear polymer based on carbonic ester, thermoplastic synthetic resin produced using bisphenol and phosgene).

Accordingly, in this embodiment, through a test in which a cartridge 10 having a polycarbonate-made casing is brought into contact with various kinds of materials under a load of approximately 1 kg and repeatedly moved there in the forward and backward directions (moved to reciprocate), a selection was made to the material most suitable for the introduction guides 22 to 24 for guiding the cartridge 10. The materials tested were (1) a stainless, (2) a phosphor bronze, (3) a galvanized steel plate, (4) a nickel-plated steel plate, (5) a steel plate coated with a fluorine-based material, (6) an ABS (acrylonitrile-butadiene-styrene resin), (7) a polyacetal (acetal resin), and (8) a fluorine contained resin. The characteristics thereof shown from the test results are as follows:

(1) stainless: the frictional force rapidly increased after the reciprocating movement was made tens of times, and a resistance like absorption occurred, thus decided as an unsuitable material;

(2) phosphor bronze :abrasion remarkably took place, thus decided as an unsuitable material;

(3) galvanized steel plate : plating came off, thus decided as an inappropriate material;

(4) nickel-plated steel plate: the frictional force rapidly increased after the reciprocating movement was made tens of times, and a resistance like absorption occurred, thus decided as an unsuitable material;

(5) steel plate coated with a fluorine-based material coating came off;

(6) ABS abrasion remarkably occurred, thus decided as inappropriate material;

(7) polyacetal contact resistance is low, strength/abrasion resistance is excellent, thus decided as a suitable material; and (8) fluorine contained resin strength is too low to fulfill the guiding functions.

Incidentally, although (1) the stainless and (4) the nickel-plated steel plate are superior in abrasion resistance, they are uncongenial with the polycartronate, and seem to be inappropriate to use for a portion subject to a load exceeding 1 kg.

From the above-mentioned test results, in this embodiment, the introduction guides 22 to 24 are made of a polyacetal (acetal resin, straight-chain synthetic resin; a material synthesized by the addition polymerization of formaldehyde or by the ring scission polymerization of trioxane).

On the other hand, as shown in FIGS. 5 to 10, the detent mechanisms 30, 30 are also paired and disposed symmetrically in the left- and right-hand directions and incorporated into the left and right introduction guides 24, 24, respectively.

Each of the detent mechanisms 30, 30 locks the cartridge 10 discharged from the deck Sa to fulfill a function of preventing the cartridge 10 from jumping out from the openina section 5b and further attains a function as a positioning mechanism to position the cartridge 10 at an appropriate extraction position where the accessor 7 can extract the cartridge 10 at the discharge of the cartridge 10 from the deck 5a.

Furthermore, in this embodiment, each of the detent mechanisms 30, 30 is composed of a lock lever (locking member) 31, a rotary shaft 32 and a spring (biasing member) 33.

The lock lever 31 is attached to the introduction guide 24 to be swingable around the rotary shaft 32. The rotary shaft 32 is placed in a direction parallel to the insertion/extraction directions of the cartridge 10. The tip portion of the lock lever 31 is provided with a claw portion 31a made to protrude from the introduction guide 24 toward the cartridge 10 side. This claw portion 31a is fitted in a groove portion 10a previously made in a side portion of the cartridge 10 discharged from the deck 5a for making the cartridge 10 locked at a given position (the above-mentioned appropriate extraction position) in a positioned condition.

As shown in FIGS. 7 to 11, both the groove portions 10a, 10a made in both the side portions of the cartridge 10 are used for positioning the cartridge 10 when the cartridge 10 is stored in a cell of the storage rack, the CAS 11 or the DEE 12. These groove portions 10a, 10a mate with positioning lock members (not shown) placed on the cell of the storage rack, the CAS 11 or the so that the cartridge 10 can be locked and stored at a given position in a positioned condition.

In addition, tapered surfaces 31b, 31c are formed before and after the claw portion 31a. The front side tapered surface 31b of the claw portion 31a is formed as a surface having an acute angle with respect to a side surface of the cartridge 10 at the insertion into the deck 5a, while the rear side tapered surface 31c of the claw portion 31a is formed as a surface having an obtuse angle relative to the side surface of the cartridge 10 at the insertion into the deck 5a. The angles of these tapered surfaces 31b, 31c are set in accordance with an inserting force by the accessor 7 or a discharging force from the deck 5a as will be mentioned herein later.

Still further, the spring 33 is interposed between the introduction guide 24 and the lock lever 31 wound around the outer circumference of the rotary shaft 32, and functions to bias the lock lever 31 toward the cartridge 10 side. The biasing force of this spring 33 is determined such that the claw portion 31a of the lock lever 31 is put out of the way (retreated) when the accessor 7 performs the insertion/extraction of the cartridge 10, while the claw portion 31a of the lock lever 31 is fitted in the groove portion 10a to lock the cartridge 10 when the deck 5a discharges the cartridge 10. In FIG. 7, solid lines and broken lines denote a state in which the lock lever 31 is put out of the way by the cartridge 10, while two-dot chain lines indicates a state (locked condition or ordinary condition) where the lock lever 31 is not put out of the way.

The cartridge insertion/discharge opening structure 20 according to an embodiment of this invention is constructed as described above, and the following effects are therefore attainable.

At the power-on to the library apparatus 1, the accessor 7 performs the following deck position detecting operations as the initial operations to find the position of the opening section 5b (introduction guides 22 to 24) of the deck 5a.

That is, an optical sensor (not shown) on the accessor 7 side identifies the X reference position 26a and Y reference position 26b of the reference flag 26 to detect the X-Y position of the deck 5a, and the accessor 7 detects the Z position of the deck 5a by bringing the hand member of the hand mechanism 7d into contact with the hand strike portion (Z reference plane) 27 on the base member 21, thus storing these X, Y and Z positions in advance.

Thereafter, the accessor 7 carries out the insertion/extraction operations of the cartridge 10 on the basis of the three-dimensional positions of the deck 5a detected and stored as mentioned above.

At this time, because of the occurrence of the difference in position between the accessor 7 (hand mechanism 7d) and the deck 5a or because of a slight discrepancy in the gripping position of the cartridge 10 by the hand mechanism 7d, there is a possibility that the difference in position slightly occurs between the cartridge 10 and the deck 5a.

In this embodiment, the introduction guides 22 to 24 placed at upper, lower, left and right portions of the opening section 5b of the deck 5a have the tapered surfaces 22a to 24a formed to broaden out or develop from the deck 5a side to the external. In other words, when viewed from the accessor 7 side, the compartment for the insertion of the cartridge 10 into the deck 5a is in an enlarged condition.

Accordingly, even if the discrepancy in position somewhat takes place between the cartridge 10 to be inserted and the opening section 5b of the deck 5a, the cartridge 10 is brought into contact with the introduction guides 22 to 24 and, hence, is surely inserted into the deck 5a while being guided by their tapered surfaces 22a to 24a. Besides, the accessor 7 can recognize the X and Y positions of the opening section 5b (introduction guides 22 to 24) of the deck 5a with a high accuracy by using the reference flag 26 integrated with the introduction guides 22 to 24.

With this arrangement, without the intervention of the cartridge delivering and receiving mechanism taken in the prior art, direct insertion of the cartridge 10 into the deck 5a becomes possible.

Moreover, in this embodiment, by of merely attaching the base member 21 (see FIG. 6), previously equipped integrally with the introduction guides 22 to 24, the reference flag 26 and the detent mechanisms 30, to the opening section 5b of the deck 5a, the introduction guides 22 to 24, the reference flag 26 and the detent mechanisms 30 can accurately and concurrently be disposed at given positions of the opening section 5b, which allows the extremely easy realization of the cartridge insertion/discharge opening structure 20 according to this embodiment.

Furthermore, in this embodiment, a polyacetal which provides, in relation to the polycarbonate, excellent strength/abrasion resistance and less contact resistance in the test is employed as a material for the introduction guides 22 to 24.

Thus, even if the introduction guides 22 to 24 come directly into contact with the cartridge 10 at a considerable frequency, the cartridge 10 can certainly be guided into the deck 5a at all times without the occurrence of the problems resulting from the strength or the abrasion.

On the other hand, the lock lever 31 of each of the detent mechanisms 30 is biased by the biasing force of the spring 33 to the inside of the introduction guide 24 (the cartridge 10 side), and the claw portion 31a at its tip portion is located to protrude toward the inside of the introduction guide 24.

Furthermore, at the insertion of the cartridge 10, the front side tapered surface 31b of the claw portion 31a comes into contact with the rear end surface (the left side end surface of the right-hand cartridge 10 in FIG. 9) and side surface of the cartridge 10, so that the lock lever 31 goes to the outside of the introduction guide 24 against the biasing force of the spring 33 to rock around the rotary shaft 32, thereby making the claw portion 31a put out of the way (retreated). That is, the lock lever 31 retreats to the outside of the introduction guide 24 in response to being pushed by the cartridge 10.

When the groove portion 10a passes through the position of the claw portion 31a in accordance with the inserting operation of the cartridge 10, although once mating with the groove portion 10a, this claw portion 31a is again put out of the way due to the inserting force of the accessor 7. After the cartridge 10 is completely inserted into the interior of the deck 5a, the claw portion 31a returns to the state of protruding toward the inside of the introduction guide 24.

In this embodiment, the angle of the tapered surface 31b relative to the cartridge 10 side surface is set to minimize the load (the biasing force of the spring 33) against the inserting force of the accessor 7, with the result that the accessor 7 easily and certainly accomplish the insertion of the cartridge 10.

Still further, the cartridge 10 discharged from the deck 5a advances while pressing the rear side tapered surface 31c of the claw portion 31a, and after the completely discharged condition, comes into the locked and held condition so that the claw portion 31a at the tip portion of the returned lock lever 31 comes in the groove portion 10a as shown in FIG. 11.

More specifically, in this embodiment, the biasing force of the spring 33 is set so that, although owing to the discharging force of the deck 5a, the cartridge 10 reaches the position where the claw portion 31a engages with the groove portion 10a. The claw portion 31a is inhibited from being again put out of the way against the biasing force of the spring 33.

Accordingly, as a result of only discharging the cartridge from the deck 5a, as shown in FIG. 11, the cartridge 10 is stopped in the locked condition where the claw portion 31a engages with the groove portion 10a and locked with the claw portion 31a, thus surely preventing the cartridge 10 from jumping out toward the external or dropping due to vibrations or the like. In addition, when taking the locked condition in which the claw portion 31a is fitted in the groove portion 10a, the cartridge 10 is made to be positioned at an appropriate insertion/extraction position where the insertion/extraction of the cartridge 10 is achievable by the accessor 7.

The cartridge 10 held in the condition of being locked by the claw portion 31a as mentioned above is gripped and pulled out by the hand mechanism 7d of the accessor 7.

At that pulling-out operation, the rear side tapered surface 31c of the claw portion 31a is placed into contact with the groove portion and side surface of the cartridge 10, and hence, as in the case of the insertion operation, the lock lever 31 advances toward the outside of the introduction guide 24 against the biasing force of the spring 33 to rock around the rotary shaft 32, thus causing the claw portion 31a to be put out of the way. Further, when the cartridge 10 is completely pulled out from the deck 5a, the claw portion 31a returns to the condition of protruding the inside of the introduction guide 24. Thus, at the extraction of the cartridge 10 by the accessor 7, the claw portion 31a is completely put out of the way against the biasing force of the spring 33 to allow the extraction of the cartridge 10 to be done without any troubles.

In this embodiment, the biasing force of the spring 33 and the angle of the tapered surface 31c of the claw portion 31a are determined so that the load for retreating the lock lever 31 to the outside of the introduction guide 24 is below the discharging force of the deck 5a or the extracting force of the accessor 7, and a load works on the cartridge 10 to prevent the cartridge 10 from jumping out or dropping due to vibrations or the like in the cartridge 10 held condition (locked condition) shown in FIG. 11.

The installation and use of the above-described detent mechanisms 30 can surely prevent the cartridge 10 from jumping out toward the external at its discharge or from dropping due to vibrations or the like, and further can always position the cartridge 10, discharged from the deck 5a, at a constant extraction position, with the result that, without the intervention of the cartridge delivering and receiving mechanism taken in the prior art, the direct extraction of the cartridge 10 from the deck 5a is possible through the use of the accessor 7.

Thus, according to the cartridge insertion/discharge opening structure 20 constituting an embodiment of this invention, even if the introduction guides 22 to 24 come directly into contact with the cartridge 10 at a considerable frequency, the cartridge 10 can always certainly be guided into the deck 5a without the occurrence of problems resulting from the strength or the abrasion. As a result, the accessor 7 can surely carry out the direct insertion/extraction of the cartridge 10 into/from the deck 5a, and hence, without the installation of the cartridge delivering and receiving mechanism in each of the decks 5a. The insertion/extraction of the cartridge 10 into/from each of the decks 5a is directly feasible by the hand mechanism 7d, which contributes to the size and cost reduction of the library apparatus 1.

It should be understood that the present invention is not limited to the above-described embodiment, and that it is intended to cover all changes and modifications of the embodiment of the invention herein used for the purpose of the disclosure, which do not constitute departures from the spirit and scope of the invention.

What is claimed is:

1. A cartridge insertion/discharge opening structure of a recording/reproduction unit for use in a library apparatus for storing cartridges, each accommodating a storage medium in a casing mainly made of polycarbonate, the library apparatus having a transferring mechanism for transferring the cartridges stored in the library apparatus, the recording/reproduction unit being operable to perform a recording/reproduction process on the storage media within the cartridges transferred by the transferring mechanism, said cartridge insertion/discharge opening structure comprising:

a base member having an opening generally corresponding to a cartridge insertion/discharge opening section of the recording/reproduction unit for allowing the cartridges to be inserted into the recording/reproduction unit; and at least one guide member attached to said base member near a top of said opening and at least one guide member attached to said base member near a bottom of said opening for guiding the cartridges to be inserted into the recording/reproduction unit by the transferring mechanism, said guide members being made of polyacetal and extending into said opening of said base member to define a clearance space between said top and said bottom of said opening of said base member and a cartridge inserted in said cartridge insertion/discharge opening section of the recording/reproduction unit, to allow the transferring mechanism to release said cartridge once said cartridge is inserted in said cartridge insertion/discharge opening section.

2. The structure of claim 1 wherein a pair of guide members are attached to said base member near said top of base member, and a pair of guide members are attached near said bottom of said base member.

3. The structure of claim 2 wherein said guide members attached near said top and said bottom of said base member each have a tapered surface that flare outwardly from the cartridge insertion/discharge opening structure.

4. The structure of claim 2 further including a guide member attached to said base member near each side of said opening and extending into said opening of said base member.

5. The structure of claim 4 wherein said guide members attached near said each side of said base member each have a tapered surface that flare outwardly from the cartridge insertion/discharge opening structure.

* * * * *

UNITED STATES PATENT AND TRADEMARK OFFICE
CERTIFICATE OF CORRECTION

PATENT NO. : 6,040,956
DATED : March 21, 2000
INVENTOR(S) : Utsumi

It is certified that error appears in the above-indentified patent and that said Letters Patent is hereby corrected as shown below:

In the Claims:

In claim 2, line 2, after "top of" insert
--said--

Signed and Sealed this

Twenty-fourth Day of April, 2001

Attest:

NICHOLAS P. GODICI

Attesting Officer     Acting Director of the United States Patent and Trademark Office